(12) United States Patent
Aronzon et al.

(10) Patent No.: US 9,762,961 B2
(45) Date of Patent: Sep. 12, 2017

(54) APPARATUS AND METHOD FOR MANAGING PARENTAL CONTROL

(75) Inventors: Michael Aronzon, Toronto (CA); Bruce Hawver, Hawthorn Woods, IL (US); Kim Rom, Valby (DK); Arnie Grever, Palatine, IL (US)

(73) Assignee: STEELSERIES ApS, Fredriksberg (DK)

( * ) Notice: Subject to any disclaimer, the term of this patent is extended or adjusted under 35 U.S.C. 154(b) by 1770 days.

(21) Appl. No.: 12/538,621

(22) Filed: Aug. 10, 2009

(65) Prior Publication Data
US 2011/0034242 A1 Feb. 10, 2011

(51) Int. Cl.
| | |
|---|---|
| *H04N 21/454* | (2011.01) |
| *A63F 13/79* | (2014.01) |
| *A63F 13/75* | (2014.01) |
| *A63F 13/77* | (2014.01) |
| *H04N 21/45* | (2011.01) |
| *A63F 13/212* | (2014.01) |

(52) U.S. Cl.
CPC .......... *H04N 21/454* (2013.01); *A63F 13/75* (2014.09); *A63F 13/77* (2014.09); *A63F 13/79* (2014.09); *H04N 21/4532* (2013.01); *H04N 21/4542* (2013.01); *A63F 13/212* (2014.09); *A63F 2300/1012* (2013.01); *A63F 2300/532* (2013.01); *A63F 2300/552* (2013.01); *A63F 2300/5586* (2013.01)

(58) Field of Classification Search
USPC ....... 713/182; 725/32, 34, 35, 44, 45, 46, 47
See application file for complete search history.

(56) References Cited

U.S. PATENT DOCUMENTS

| | | | |
|---|---|---|---|
| 5,755,620 A * | 5/1998 | Yamamoto | A63F 13/10 463/34 |
| 2004/0002369 A1* | 1/2004 | Walker | A63F 13/12 463/1 |
| 2005/0081043 A1* | 4/2005 | Evans | H04N 7/162 713/182 |
| 2006/0224900 A1* | 10/2006 | Watanabe | G06F 21/32 713/186 |
| 2008/0040748 A1* | 2/2008 | Miyaki | G11B 27/036 725/46 |
| 2008/0182232 A1* | 7/2008 | Bannwolf | G09B 7/02 434/350 |
| 2009/0069084 A1 | 3/2009 | Reece et al. | |
| 2009/0085724 A1* | 4/2009 | Naressi | G06F 21/10 340/10.6 |
| 2009/0133089 A1 | 5/2009 | Ku et al. | |

* cited by examiner

*Primary Examiner* — Tsan-Yu J Huang
(74) *Attorney, Agent, or Firm* — Guntin & Gust, PLC; Matthew Tropper

(57) ABSTRACT

A system that incorporates teachings of the present disclosure may include, for example, a device that can receive a parental control signal that designates undesired content, determine when a restricted user is interacting with a gaming software application, and modify a presentation of the gaming software application to remove the undesired content when the restricted user is interacting with the gaming software application. Additional embodiments are disclosed.

20 Claims, 8 Drawing Sheets

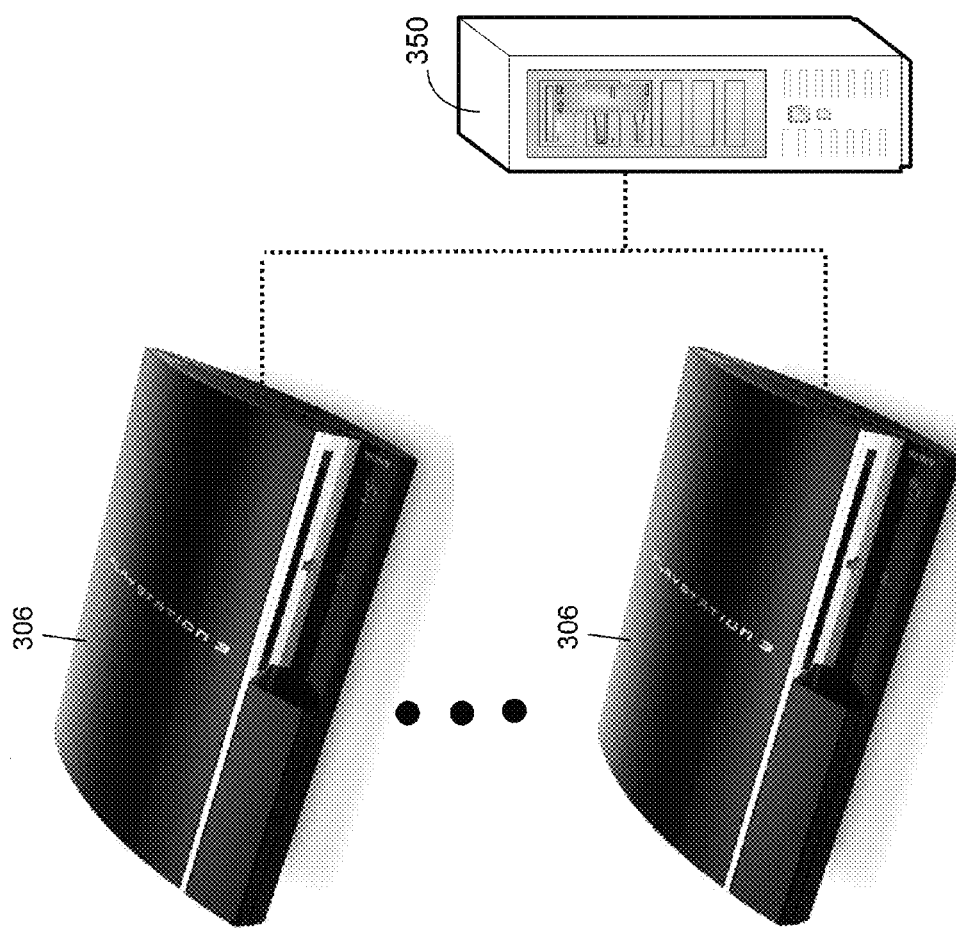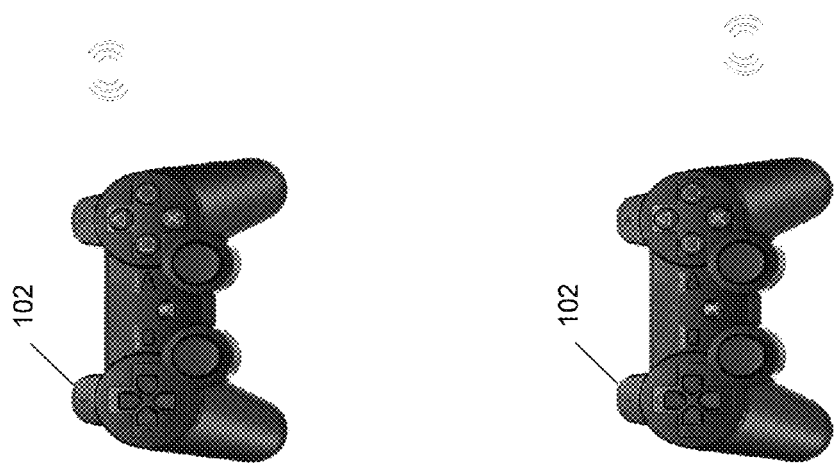
FIG. 3
300

600

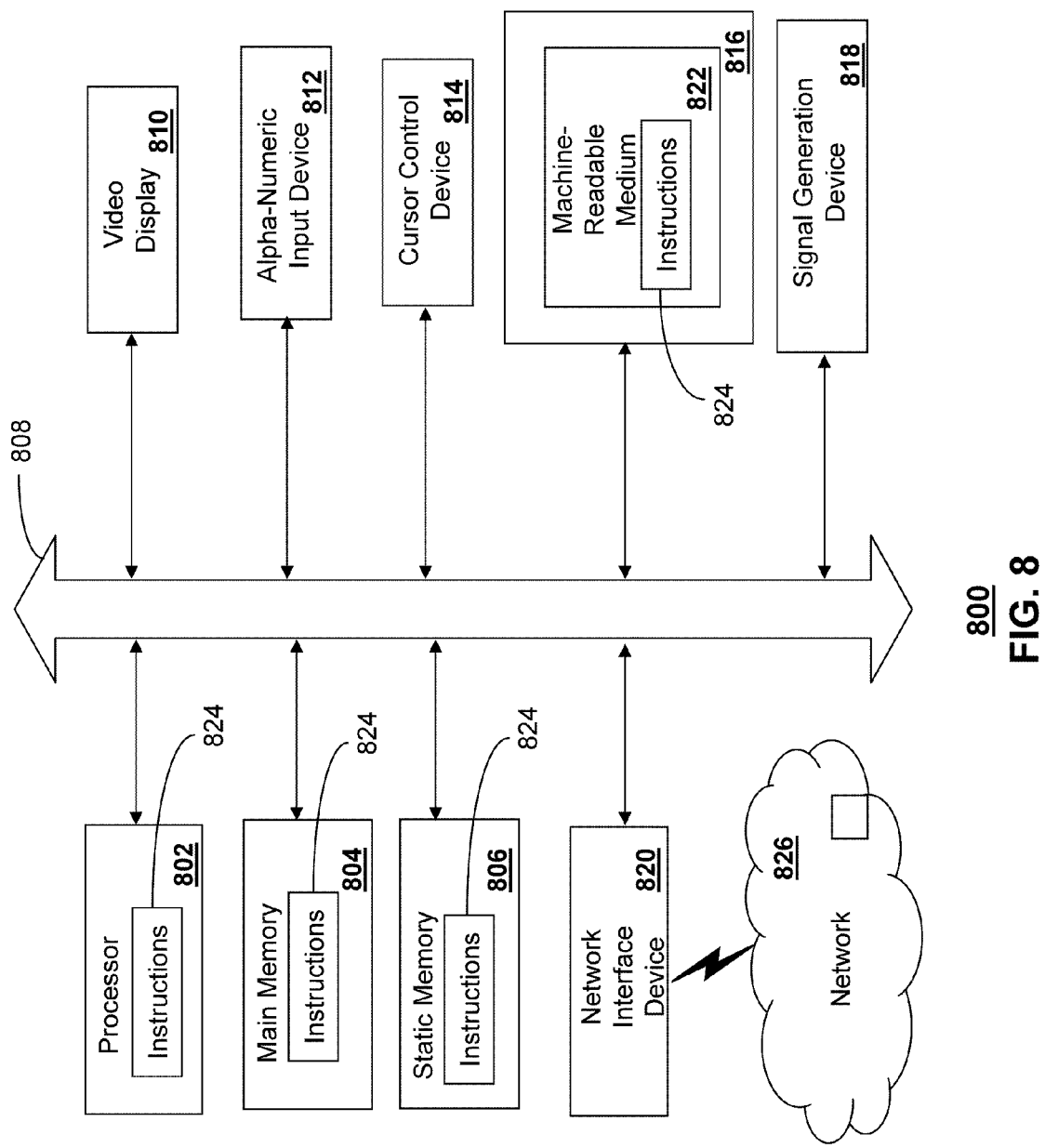

APPARATUS AND METHOD FOR MANAGING PARENTAL CONTROL

FIELD OF THE DISCLOSURE

The present disclosure relates generally to gaming applications, and more specifically to an apparatus and method for managing parental control.

BACKGROUND

Video games are directed towards a variety of themes, which can include content that may not be suitable for all users. For instance, some video games may include content that is violent in nature and/or sexual in nature. The Entertainment Software Rating Board (ESRB) is a self-regulatory body that independently assigns ratings to video games. Developers can print or otherwise display the ESRB rating, such as on the cover of a DVD having a gaming software application. However, the ESRB rating system is voluntary.

The type of content included in a particular video game can be of importance to a parent. The ability to efficiently exert parental control over users, such as children, can be a factor in whether a parent will purchase or otherwise allow a video game to be utilized by a child.

BRIEF DESCRIPTION OF THE DRAWINGS

FIGS. 2-3 depict illustrative embodiments for gaming systems that can implement the GUI of FIG. 1;

FIG. 8 depicts an illustrative diagrammatic representation of a machine in the form of a computer system within which a set of instructions, when executed, may cause the machine to perform any one or more of the methodologies disclosed herein.

DETAILED DESCRIPTION

Figure 1:
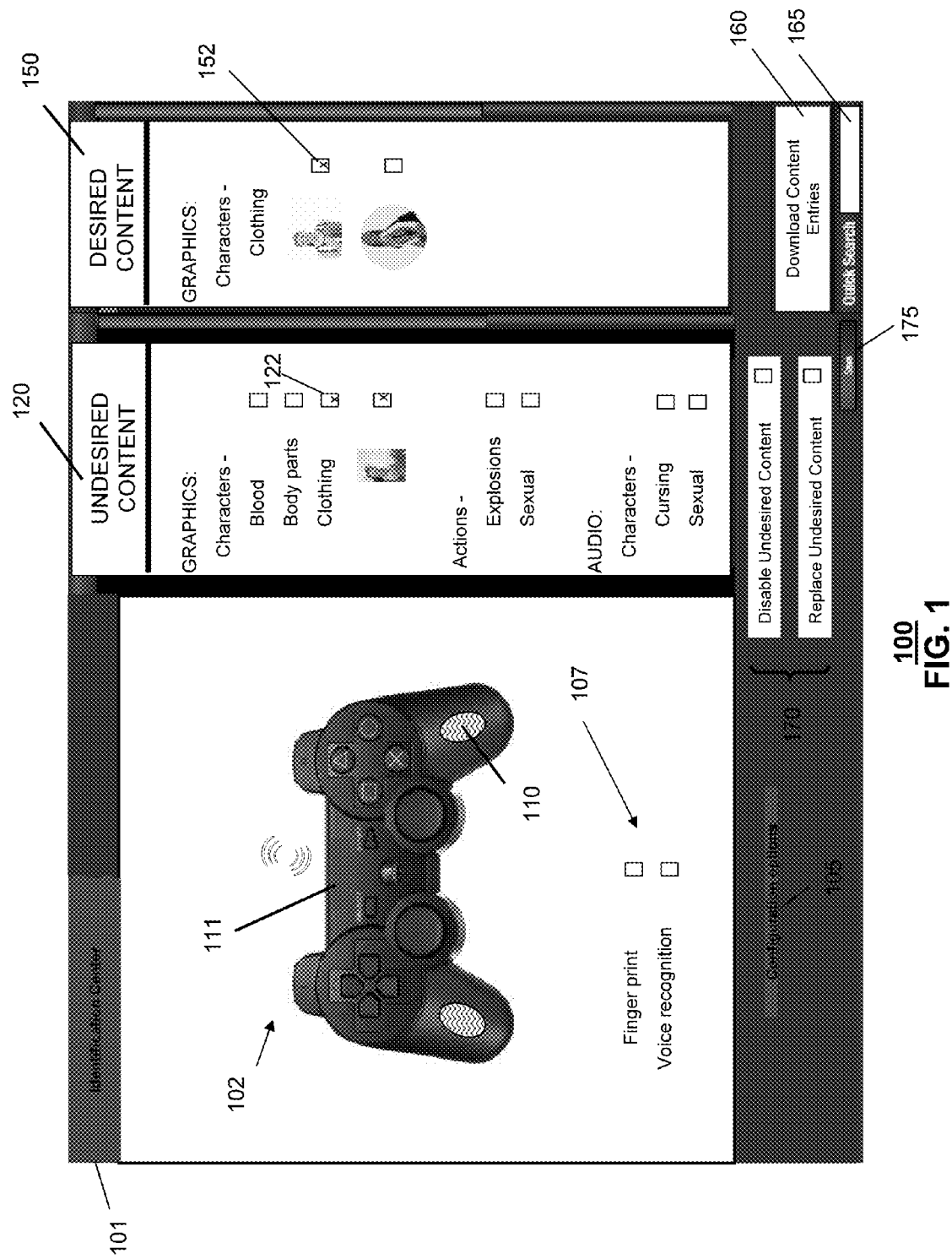
FIG. 1 depicts an illustrative embodiment of a Graphical User Interface (GUI) generated by a computing device according to the present disclosure.

One embodiment of the present disclosure can entail a computing device for receiving a removable storage medium having a gaming software application stored thereon. The computing device can comprise a controller to store a user profile, receive a parental control signal that designates undesired content, adjust the user profile based on the parental control signal, determine when a restricted user associated with the user profile is interacting with the gaming software application, and modify a presentation of the gaming software application to remove the undesired content based on the user profile when the restricted user is interacting with the gaming software application.

One embodiment of the present disclosure can entail a gaming accessory in communication with a computing device. The gaming accessory can comprise a controller to transmit a parental control signal to the computing device where the parental control signal designates undesired content associated with a gaming software application of the computing device, obtain identification information from a user of the gaming accessory, transmit the identification information to the computing device where the identification information is used to determine when the user is a restricted user, and transmit game control signals to the computing device for user interaction with the gaming software application where a presentation of the gaming software application is modified by the computing device to remove the undesired content when the user is the restricted user.

One embodiment of the present disclosure can entail a method comprising storing a user account in a computing device, receiving a parental control signal at the computing device that designates undesired content, adjusting the user account based on the parental control signal, determining when a restricted user associated with the user account is utilizing a gaming software application of the computing device, and modifying a presentation of the gaming software application to remove the undesired content based on the user account when the restricted user is utilizing the gaming software application.

One embodiment of the present disclosure can entail a computer-readable storage medium operating in a computing device, where the storage medium comprises computer instructions to present a video game, and where undesired content is replaced with desired content based on a user profile associated with a restricted user when a determination is made that the restricted user is interacting with the video game.

One embodiment of the present disclosure can entail a method comprising determining undesired content associated with a gaming software application, removing the undesired content during presentation by a first computing device of the gaming software application when a determination is made that a user of the first computing device is a restricted user interacting with the gaming software application, and presenting the undesired content of the gaming software application on a second computing device, where the presentation of the gaming software application by the first and second computing devices is in temporal proximity and wherein the first and second computing devices interact with the gaming software application.

FIG. 1 depicts an illustrative embodiment of a Graphical User Interface (GUI) 100 for implementing parental control, such as generated by a Parental Control Software (PCS) application according to the present disclosure. The GUI 100 can be manipulated through use of any number of devices, including keyboards, joysticks and so forth. The PCS application can operate in a computing device such as a desktop computer, a laptop computer, a server, a mainframe computer, or a gaming console. The PCS application can also operate in other computing devices with less computing resources such as a cellular phone, a personal digital assistant, a media player (such as an iPOD™), and a gaming accessory (e.g., a joystick). From these illustrations it would be apparent to an artisan with ordinary skill in the art that the PCS application can operate in any device with computing resources, as well as in a distributed environment. For example, a user's computing device can communicate with the PCS application that is running on a media server or other remote computing resource.

GUI 100 provides the capability of implementing parental control for one or more gaming software applications that are presented by a computing device. GUI 100 can include an identification center 101 that allows for establishing the parameters and/or being made aware of the techniques that are utilized by the PCS application for monitoring the particular user that is interacting with the gaming software application through use of a gaming accessory or peripheral device 102. The particular individual that is provided with access to GUI 100 can vary, such as a parent, and for simplicity will be referred to herein as the administrator. Password protection or other techniques can be utilized to provide limited access to the GUI 100 so that the parental control can be maintained by the individual who is intended to have such control. The particular type of accessory 102 can vary and can include a joystick, a mouse, a keyboard or other devices that allow a user to interact with the computing device and the gaming software application.

GUI 100 can include configuration options 105 that allows the user to access various features for configuring the accessory 102. For instance, a list of identification options 107 can be provided for selection by the administrator, such as finger print identification and/or voice recognition. The present disclosure contemplates the use of other identification information and combinations of such information, including biometric parameters of a user, passwords and so forth. The identification center 101 can display the components of the accessory 102 that will be utilized in implementing the user identification techniques. For example, finger print scanners 110 and/or a microphone 111 can be included on the accessory 102 and shown in the GUI 100. In one embodiment, the particular scanners 110 that are to be utilized can be selected by the administrator through use of GUI 100, such as scanners located on a portion of the gaming accessory 102 that the user will be more comfortable contacting.

The configuration options 105 can include selections for the technique that is utilized in the identification of the user. For instance, the administrator can designate the time periods of obtaining or otherwise detecting the identification information (such as the finger print scanning). The time periods can vary such as continuous monitoring of the finger print information or periodic monitoring. Continuing with this example, the administrator may desire to have monitoring performed over short time periods so that an authorized user is unable to commence interaction with the video game and then have an unauthorized user continue the interaction.

In another embodiment, the monitoring can be pursuant to a prompt or other reminder provided to the user so that the user is not required to continuously depress a particular scanner or otherwise provide biometric information in a continuous fashion. For example, a visual and/or audio prompt can be provided to the user which allows the user to place his or her finger on the finger print scanner or otherwise provide the biometric and/or identification information to the gaming accessory 102. The user can be allowed a response period to provide the identification information after which the gaming software application is paused or otherwise stopped. In one embodiment, the user can be periodically prompted to speak a predetermined word which is then processed using voice recognition to make an identification determination.

GUI 100 can present information 120 associated with undesired content that is to be removed from the presentation of the gaming software application by the computing device. The undesired content information 120 can be a list of options that may be selected by the administrator for removal, such as graphics and/or audio content, through use of a removal actuator 122 or other indicator. The particular undesired content can vary and can include violent content and/or sexual content, including content associated with characters, actions, environment and so forth. For instance, the undesired content information 120 can allow for selection of removal of blood, body parts, and types of clothing, as well as sexual actions, cursing and so forth.

The level of detail of the options presented in the GUI 100 for selection by the administrator can vary. For example, particular words can be listed so that the administrator can remove them on an individual basis. The undesired content information 120 can be displayed through text, graphical examples, and so forth. The present disclosure also contemplates the use of categories of undesired content for removal, such as "sexual clothing" so that the administrator does not need to review all of the content. In one embodiment, the undesired content information 120 can be based on the particular gaming software applications that are available to the computing device. For instance, as new releases of video games come out, the GUI 100 can be updated with undesired content associated with the new releases. The updates can be received in a number of different ways, including over the Internet.

In another embodiment, the undesired content information 120 can be customized for particular video games that are associated with the particular computing device, such as video games that have been purchased by users associated with the computing device. Continuing with this example, as a video game is purchased, a media server or other remote resource can be made aware of the purchase (such as by being notified via the Internet by a retailer) and can update the computing device based on a database of potentially undesired content that has been determined for the particular video game and stored in a database accessible by the media server. Other techniques can also be used for providing undesired content information 120 that is customized to particular video games, such as receiving a selection of the particular video game(s) from the administrator. The GUI 100 can then retrieve entries for the undesired content information 120 based on the identified video games that the administrator has determined may be presented by his or her computing device.

GUI 100 can also present information 150 associated with desired content that is to be used to replace the undesired content during the presentation of the gaming software application by the computing device. The desired content information 150 can be a list of options that may be selected by the administrator for replacement of the undesired content, such as graphics and/or audio content, through use of a replacement actuator 152 or other indicator. The particular desired content can vary and can include non-violent actions, including content associated with characters, actions, environment and so forth. For instance, the desired content information 150 can allow for selection of replacement of types of clothing and so forth.

The level of detail of the options presented for selection by the administrator can vary. For example, particular words can be listed so that the administrator can replace them on an individual basis with other words. The desired content information 150 can be displayed through text, graphical examples, and so forth. The present disclosure also contemplates the use of categories of desired content for replacement of the undesired content, so that the administrator does not need to review all of the content. In one embodiment, the desired content information 150 can be based on the particular gaming software applications that are available to the computing device. For instance, as new releases of video games come out, the GUI 100 can be updated with available desired content associated with the new releases. The updates can be received in a number of different ways, including over the Internet.

In another embodiment, the desired content information 150 can be customized for particular video games that are associated with the particular computing device, such as video games that have been purchased by users associated with the computing device. Continuing with this example, as a video game is purchased, a media server or other remote resource can be made aware of the purchase (such as by being notified by a retailer) and can update the computing device based on a database of potentially undesired content that has been determined for the particular video game and stored in a database accessible by the media server, as well as available desired content for replacement of the undesired content. Other techniques can also be used for providing desired content information 150 that is customized to particular video games, such as receiving a selection of the particular video game(s) from the administrator. The GUI 100 can then retrieve entries for the desired content information 150 based on the identified video games that the administrator has determined may be presented by his or her computing device.

GUI 100 can present options 170 for removal of the undesired content and replacement with the desired content. The present disclosure contemplates removal of the undesired content being performed in a number of different ways. For instance, if the content is a particular action that results in a violent display then the actuation steps of the gaming accessory necessary to perform the violent action can be disabled. In another embodiment, removal of the undesired content can be performed by preventing display of the particular graphics that comprise the undesired content. For instance, if the undesired content consists of body parts flying through the air after an explosion in the video game then the removal of the undesired content can be preventing the body parts from being displayed while still allowing the particular actuation from the user that caused the video game explosion.

In another embodiment, replacement of the undesired content with the desired content can be performed by showing different graphics or presenting different audio content. For instance, a curse word can be replaced with some other word and so forth. As will be explained again later, the removal and/or replacement can be performed based on computer instructions of the PCS application, computer instructions associated with the gaming software application or both.

GUI 100 can provide for downloading of the undesired content options and/or the desired content options through use of an actuator or other button 160. The administrator can also perform searches for the undesired and/or desired content through use of an actuator or other button 165. Once the administrator has completed his or her selections of the options through use of GUI 100, the information can be saved through use of actuator or save button 175.

GUI 100 can be used for generating or adjusting user profiles for users associated with the computing device. The user profiles can be stored on a memory of the computing device for access by the PCS application and/or can be stored in a remote database accessible by the computing device.

In one embodiment, the GUI 100 can provide for storing identification information, such as a finger print sample or biometric parameter, that is to be used later for detecting whether a user is a restricted user. For example, the GUI 100 can request that the user place his or her finger on the scanner for obtaining the sample from which future monitoring will be determined. Similarly, a voice sample can be obtained that can be later used for voice recognition monitoring.

Figure 2:
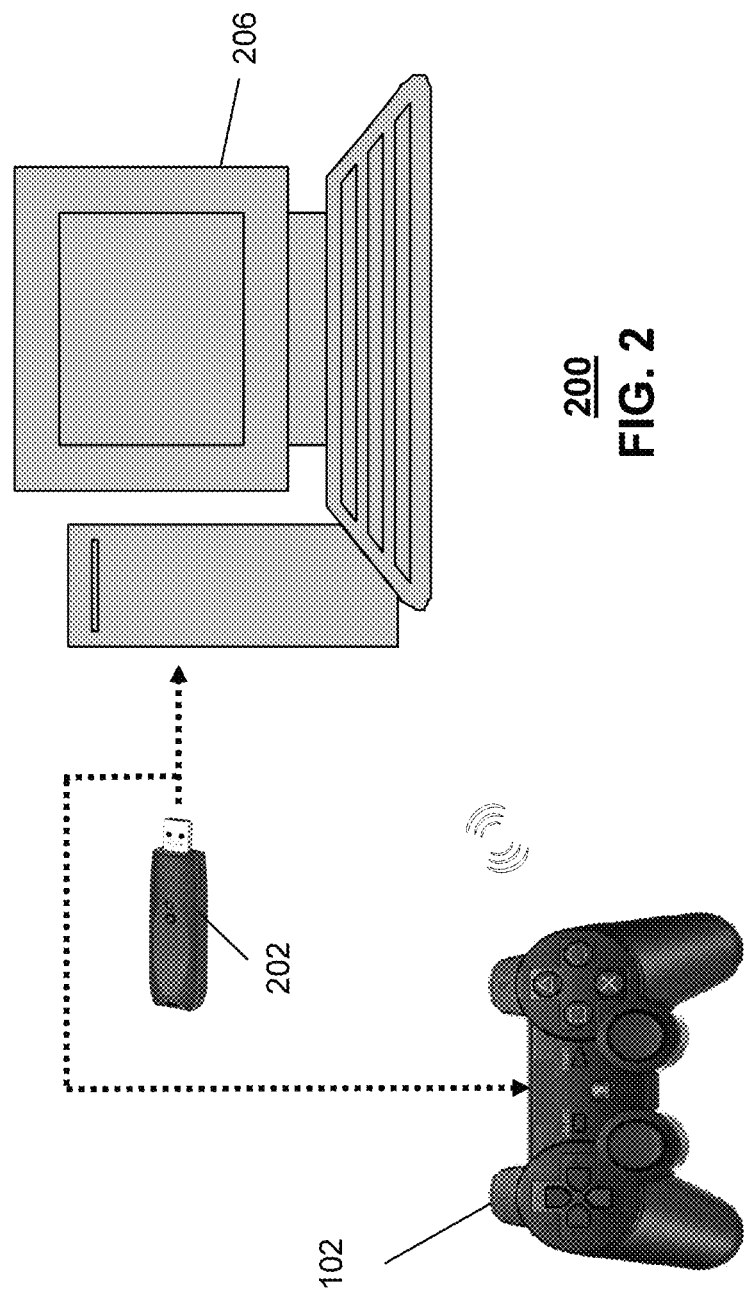

In FIG. 2, a video gaming system is shown and generally referred to by reference numeral 200. The system includes a computing device 206 and one or more gaming accessories 102 for interaction by a user with a gaming software application of the computing device. The computing device 206 can be of various types including personal computers, gaming consoles and so forth. The gaming accessories 102 can also be of various types and can be in communication with the computing device 206 through wireless and/or wired communications.

In one embodiment, a portable apparatus 202 can be programmable by the PCS application for facilitating the use of user profiles and the use of the PCS application. In this illustration, the portable apparatus can take the form of a Universal Serial Bus (USB) dongle (herein referred to as dongle 202). The dongle 202 can be communicatively coupled to the computer 206 such as by the physical interface (e.g., a USB port) or a wireless interface (e.g., Bluetooth or Wireless Fidelity (WiFi)). The dongle 202 can be used for transferring data associated with a user to other computing devices that are not associated with the user. For example, when a child goes to play a video game at his or her friend's house then the dongle 202 can be utilized as part of implementing the parental control at the other computing devices.

The dongle 202 can also be used with the gaming accessory 102 such as being interfaced therewith (physical and/or wireless) for transfer of identification information. In one embodiment, the dongle 202 can be used to provide the gaming accessory 102 with the finger print sample that is used for monitoring for a restricted user.

In FIG. 3, a gaming system is shown and generally represented by reference numeral 300. System 300 can include a plurality of computing devices 306 that different users can utilize for playing video games. Each of these computing devices 306 can include gaming accessories 102 for user interaction with gaming software applications being run by the computing devices. System 300 can provide for networking of one or more of the computing devices 306 so that users at different computing devices can play video games with each other, such as on-line gaming (e.g., Massively Multi-player Online (MMO) games).

In one embodiment, one or more servers 350 (such as media servers) can be operably coupled with the computing devices 306 for facilitating the playing of video games. For instance, the server 350 can be used for presentation of a gaming software application in coordination with each of the computing devices. In such an example, the presentation of the gaming software application can be in temporal proximity to each other for each of the computing devices. An example of this type of video game environment is MMO video games where users can interact with each other in a virtual world and often see similar displays of the virtual world.

As will be explained again later, the PCS application can be used by individual computing devices to remove undesired content and/or replace the content with desired content, while not affecting what is displayed for other users at other computing devices. This can be a useful technique that allows participation by different "rated" users in a single gaming environment so that they each are presented with age appropriate content. In one embodiment, the removal and/or replacement of content can be performed locally and independently at each computing device 306 so that processing resources are not utilized by the server 350. In another embodiment, the server 350 can facilitate the use of the PCS application, such as by providing metadata or pointers associated with undesired content being presented so that the content can more easily be removed and/or replaced.

Figure 4:
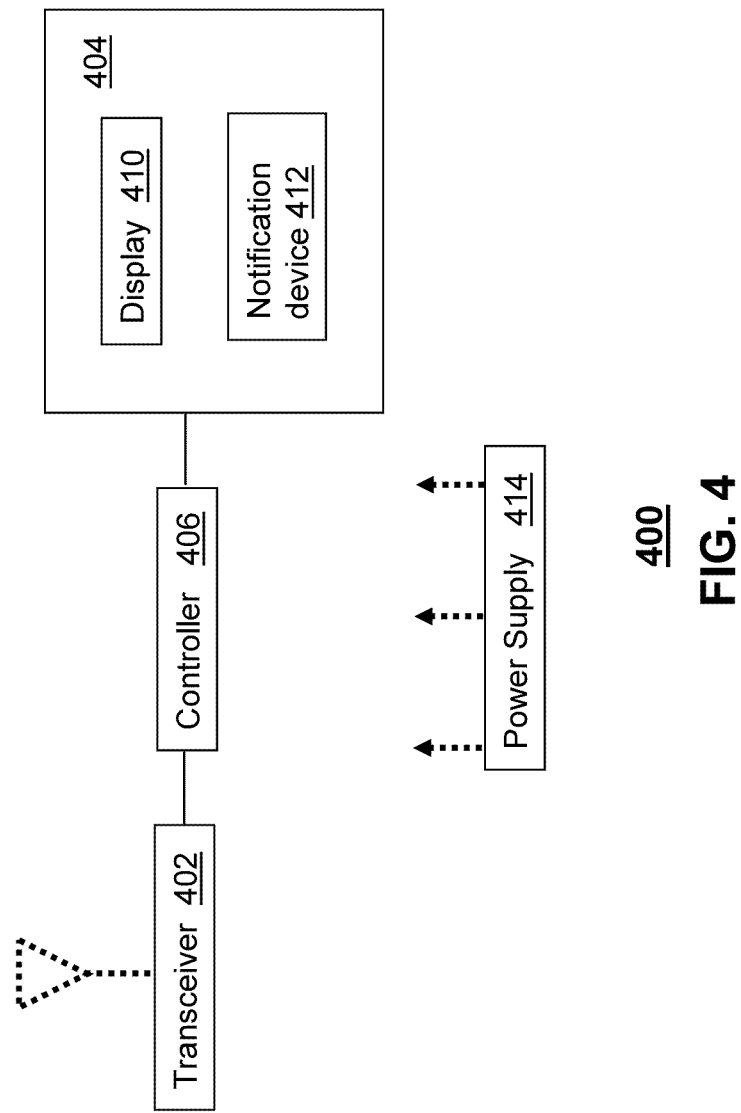
FIG. 4 depicts an illustrative embodiment of a block diagram of an apparatus of FIG. 2.

FIG. 4 depicts an illustrative embodiment of a block diagram 400 of the apparatus 202. The apparatus 202 can comprise a transceiver 402, a user interface (UI) 404, a power supply 414, and a controller 406 for managing operations thereof. The transceiver 402 can support a wireline interface such as a version of a USB interface for physically engaging with computing device 206. Other common wireline interfaces (such as Firewire and Ethernet) or proprietary wireline interfaces are contemplated by the present disclosure. The transceiver 402 can also be adapted to support wireless communications. In this latter embodiment, the transceiver 402 can utilize commonly available technology to support wireless access technologies such as Bluetooth or WiFi. Other common wireless interfaces such as Zigbee or proprietary wireless interfaces are contemplated by the present disclosure.

The UI 404 can include a display 410 such as monochrome or color LCD (Liquid Crystal Display), OLED (Organic Light Emitting Diode) or other suitable display technology for conveying images such as a menu for programming operational parameters of the apparatus 202. The UI 404 can also include a notification device 412. The notification device 412 can use common illumination technology such as an LED or OLED to inform a user of an operational state of the apparatus 202. The notification device 412 can be adapted to present two or more states of operation by way of light and/or color illumination. For example, the notification device 412 can indicate the apparatus 202 has been programmed, is in operation, is communicatively engaged with the gaming accessory 102 or gaming console 206, is receiving power, and so on, according to varying color illuminations.

The apparatus 202 can have a power supply 414 which utilizes common power management technologies such as replaceable and rechargeable batteries, supply regulation technologies, and charging system technologies for supplying energy to the components of the apparatus 202. Alternatively, the charging system can utilize external power sources such as DC power supplied over a physical interface such as a USB port. Other power supply technologies suitable to the present disclosure are contemplated.

The controller 406 can utilize computing technologies such as a microprocessor, and/or an Application Specific Integrated Circuit (ASIC) operably coupled to memory such a Flash, ROM, RAM, SRAM, DRAM or combinations thereof.

Other components not shown in FIG. 4 are contemplated by the present disclosure. For instance, the apparatus 202 can include a reset button (not shown). The reset button can be used to reset the controller 406 of the apparatus 202. In yet another embodiment, the apparatus 202 can also include a factory default setting button positioned below a small hole in a housing assembly of the apparatus 202 to force the apparatus 202 to re-establish factory settings. In this embodiment, a user can use a protruding object such as a pen or paper clip tip to reach into the hole and depress the default setting button. It will be appreciated that the apparatus 202 as described herein can operate with more or less components described in FIG. 4. These variant embodiments are contemplated by the present disclosure.

Figure 5:
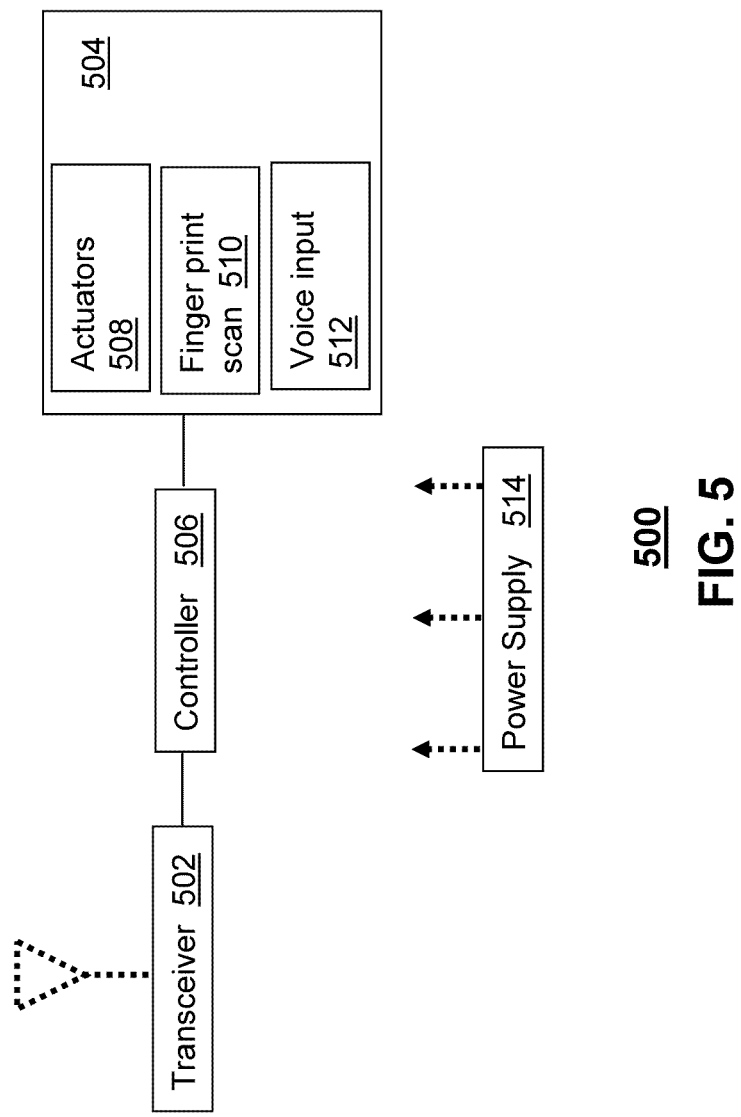
FIG. 5 depicts an illustrative embodiment of a block diagram of a gaming accessory of the systems of FIGS. 2-3.

FIG. 5 depicts an illustrative embodiment of a block diagram 500 of the gaming accessory 102. The accessory 102 can comprise a transceiver 502, a user interface (UI) 504, a power supply 514, and a controller 506 for managing operations thereof. The transceiver 502 can support a wireline interface such as a version of a USB interface for physically engaging with computing device 206. Other common wireline interfaces (such as Firewire and Ethernet) or proprietary wireline interfaces are contemplated by the present disclosure. The transceiver 502 can also be adapted to support wireless communications. In this latter embodiment, the transceiver 502 can utilize commonly available technology to support wireless access technologies such as Bluetooth or WiFi. Other common wireless interfaces such as Zigbee or proprietary wireless interfaces are contemplated by the present disclosure.

The UI 504 can include a plurality of actuators, including buttons and joysticks, that allow for user interaction with the computing device 206 and control over a video game. The UI 504 can also one or more biometric input interfaces. For instance, a finger print scanner 510 and/or a voice input component 512 can be provided that allows the accessory 102 to obtain identification information from a user of the accessory.

The accessory 102 can have a power supply 514 which utilizes common power management technologies such as replaceable and rechargeable batteries, supply regulation technologies, and charging system technologies for supplying energy to the components of the accessory 102. Alternatively, the charging system can utilize external power sources such as DC power supplied over a physical interface such as a USB port. Other power supply technologies suitable to the present disclosure are contemplated.

The controller 506 can utilize computing technologies such as a microprocessor, and/or an Application Specific Integrated Circuit (ASIC) operably coupled to memory such a Flash, ROM, RAM, SRAM, DRAM or combinations thereof. Other components not shown in FIG. 5 are contemplated by the present disclosure. For instance, the accessory 102 can include a reset button (not shown). The reset button can be used to reset the controller 506 of the accessory 102. In yet another embodiment, the accessory 102 can also include a factory default setting button positioned below a small hole in a housing assembly of the accessory to force the accessory to re-establish factory settings. In this embodiment, a user can use a protruding object such as a pen or paper clip tip to reach into the hole and depress the default setting button. It will be appreciated that the accessory 102 as described herein can operate with more or less components described in FIG. 5. These variant embodiments are contemplated by the present disclosure.

In the present context, an accessory can represent any type of device which can be communicatively coupled to the computing device and which can control aspects of the OS and/or a software application operating in the computing device. An accessory can represent for example a keyboard, a gaming pad, a mouse, a gaming console controller, a joystick, a microphone, or a headset with a microphone—just to mention a few. The keyboard and gaming pad represent accessories of a similar category since their operational parameters are alike.

A mouse, on the other hand, represents an accessory having disparate operational parameters from the keyboard or gaming pad. For instance, the operational parameters of a keyboard generally consist of alphanumeric keys, control keys (e.g., Shift, Alt, Ctrl), and function keys while the operational parameters of a mouse consist of navigation data generated by a tracking device such as a laser sensor, buttons to invoke GUI selections, and settings thereof (e.g., counts or dots per inch, acceleration, scroll speed, jitter control, line straightening control, and so on). Such distinctions can be used to identify disparate categories of accessories.

Figure 6:
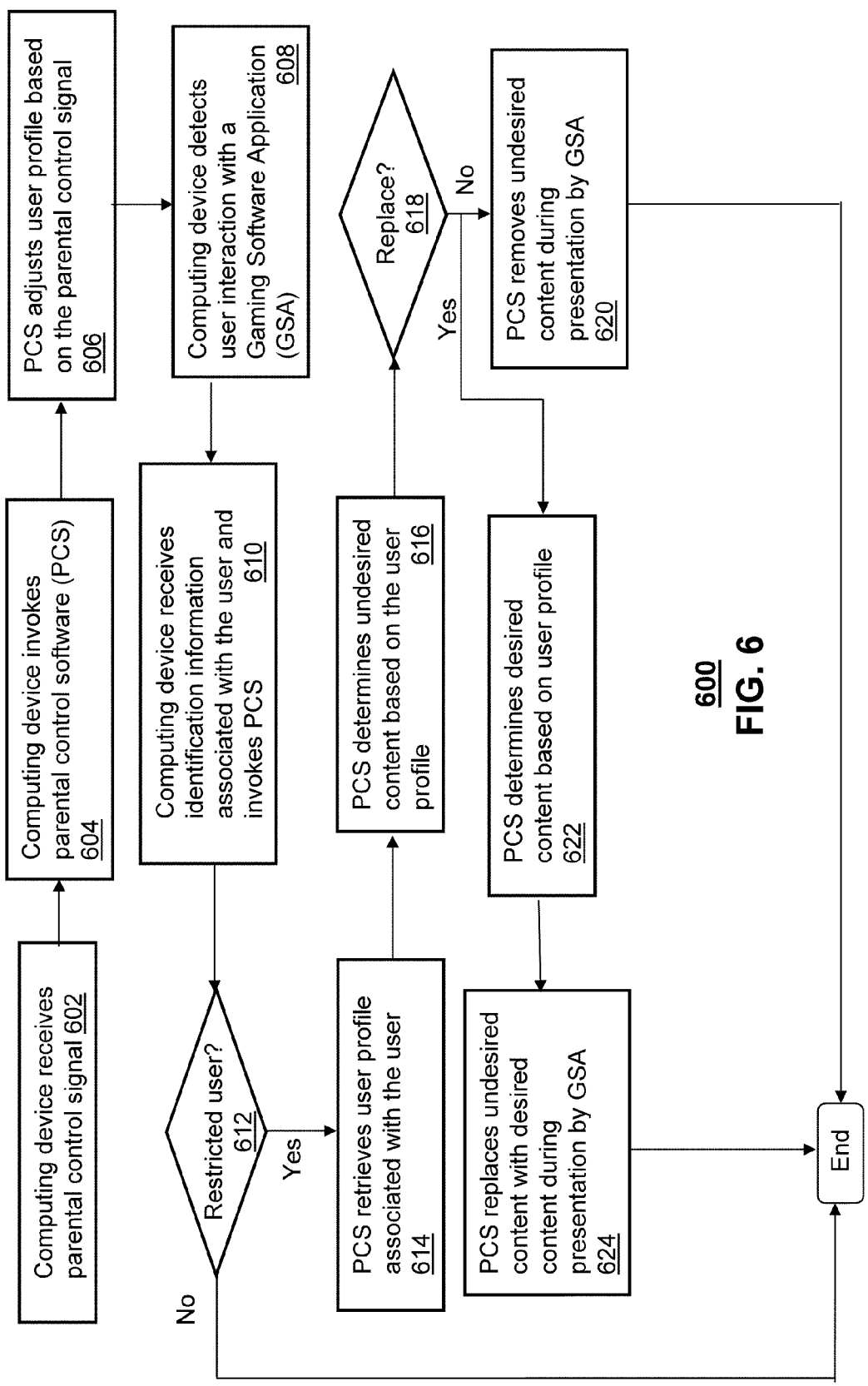
FIGS. 6-7 depict illustrative methods describing the operation of the parental control application.

FIG. 6 depicts an illustrative method 600 describing the operation of the PCS application, the accessory 102 and the computing device 206 (and/or 306). Method 600 can begin with step 602 in which an administrator (e.g., a parent) interacts with GUI 100 resulting in the generation of one or more parental control signals associated with undesired content and/or desired content. The exemplary embodiments describe the interaction with GUI 100 occurring through use of a gaming accessory 102, such as a joystick, where the GUI is displayed on a display device operably connected to the computing device 206. However, the interaction with GUI 100 can occur through use of other devices or components, including through use of other computing devices, including interaction over the Internet with a web page displaying the GUI 100. The GUI 100 can be generated by, or otherwise controlled through use of, the PCS application, although other software or techniques are also contemplated by the present disclosure.

In step 604, the PCS application or a relevant portion thereof can be invoked in the computing device in response to the parental control signal. For example, the invocation step can result from an administrator selection of the PCS application from a menu or iconic symbol presented on a desktop of the computing device by an operating system (OS) managing operations thereof. In step 606, the PCS application can adjust a user profile associated with the information contained in the parental control signal. For example, an administrator can be modifying the user profile of a single user to allow for a portion of undesired content that was previously rendered unavailable to that user, such as where the user has now turned a certain age. In another example, the administrator can be generating a new user profile for a user that has not previously used the computing device 206, such as a friend of the family that is visiting and will likely being utilizing the computing device 206. In yet another embodiment, the administrator can be generating and/or modifying a plurality of user profiles, such as where a new release having new undesired content has become available and the administrator desires to render the undesired content as unavailable for a portion or all of the users of the computing device 206.

In step 608, the computing device 206 can detect or otherwise determine user interaction with a gaming software application of the computing device. The computing device 206 can receive or obtain identification information associated with the user in step 610. For example, the gaming accessory 102 can transmit to the computing device 206 a finger print scan of the user who is manipulating the accessory. Other identification information can also be detected and transmitted to the computing device 206, such as a voice sample or biometric parameter. The particular type of identification information and the technique for detecting the information can be designated by the PCS application and/or the user profile associated with the user(s). The computing device 206 can invoke the PCS application for processing of the identification information. In one embodiment, raw data (e.g., image data from a finger print scan) can be transmitted to the computing device 206 where the PCS application can then manipulate the raw data into a usable form.

In step 612, a determination can be made as to whether the user is a restricted user for which undesired content is to be removed or otherwise made unavailable. While the present disclosure describes the accessory 102 as collecting the identification information and then transmitting it to the computing device 206 for processing, the present disclosure contemplates other devices, including the gaming accessory, processing all or a portion of the detected identification information to determine whether the user is a restricted user. For instance, the gaming accessory 206 can store the user profile and compare the detected identification information to a sample stored in the user profile in order to determine whether the user is a restricted user. The status of the user can then be transmitted to the computing device and utilized by the PCS application for implementing parental control with respect to undesired content of the gaming software application.

If it is determined that the user is not a restricted user then the gaming software application can be fully interacted with and method 600 can proceed to the end. If on the other hand the user is a restricted user then in step 614 the PCS application can access the user profile associated with the particular restricted user. In step 616, the PCS application can determine undesired content that is associated with the gaming software application based on the user profile. In step 618, the PCS application can determine whether the undesired content is to be replaced with desired content based on the user profile. If the undesired content is to be removed but not replaced then in step 620, the PCS application removes the undesired content during presentation by the gaming software application. As described earlier, the removal of the undesired content can be performed by disabling the user actuation steps that result in the particular undesired content and/or can be performed by preventing the display or presentation of the graphics and/or audio content on the display device. In one embodiment, scenarios or environments can be rendered inaccessible by the PCS application based on the user profile, such as a building in a virtual environment of the video game that contains sexual content.

Other techniques can also be employed for removal or disabling the presentation of the undesired content by the computing device. In one embodiment, the removal of the undesired content can be performed in coordination with instructions from the gaming software application. For instance, the gaming software application can provide for various levels of play based on undesired content, such as a first level that includes all content, a second level that eliminates violent content and a third level that eliminates violent and sexual content.

If the undesired content is to be replaced by desired content then in step 622 the PCS application can determine the desired content based on the user profile. In step 624, the PCS application can then replace the undesired content with the desired content during presentation of the video game by the computing device 206. In one embodiment, the replacement of the undesired content with the desired content can be performed in coordination with instructions from the gaming software application. For instance, the gaming software application can provide for various levels of play based on undesired content, such as a first level that includes all content, a second level that replaces violent content with less violent content and a third level that replaces violent and sexual content with other content.

Figure 7:
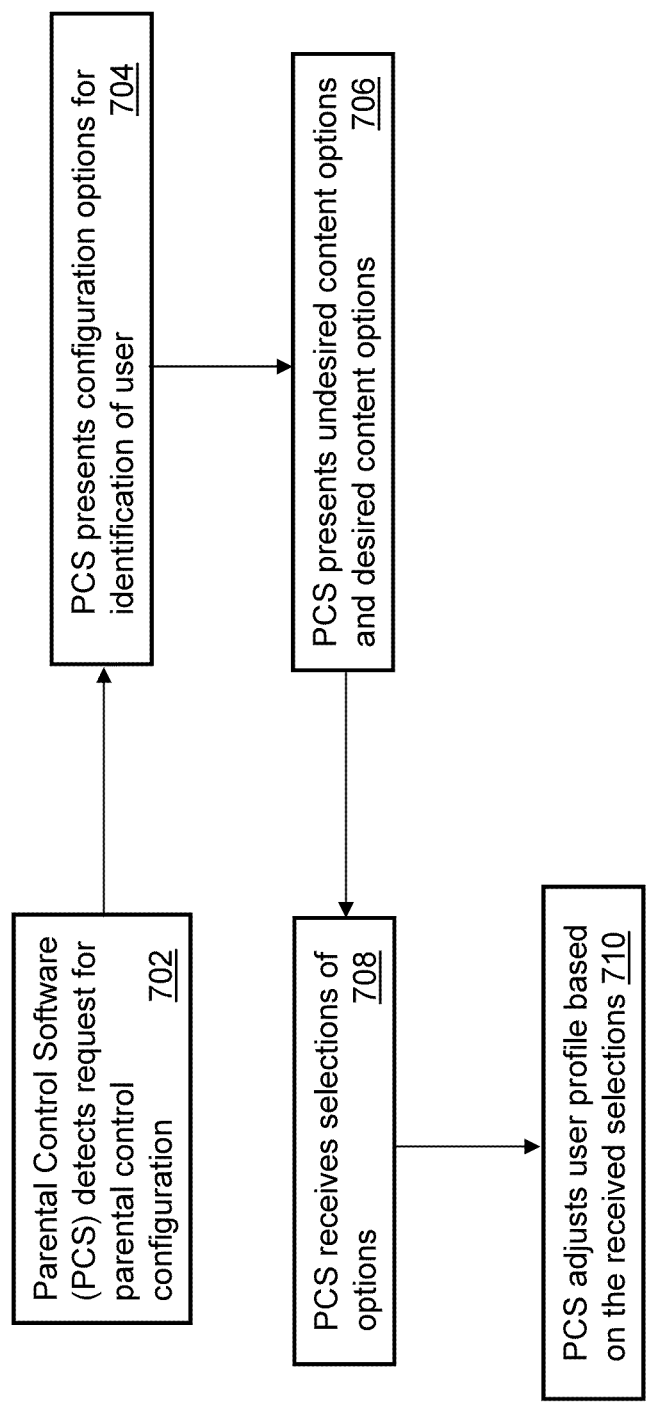

FIG. 7 depicts an illustrative method 600 describing the operation of the GUI 100 and the PCS application. Method 700 can begin with step 702 in which the PCS application detects a request for parental control configuration. The PCS application through use of GUI 100 can present configuration options for identification of a user of the gaming software application in step 704. In step 706, the PCS application can present undesired content options and desired content options to the administrator (e.g., a parent) through the GUI 100.

The administrator can then interact with the GUI 100 to select the options and thus designate undesired content and/or desired content in step 708. As described earlier, the detail as to which the designations occur can vary. For instance, the administrator can designate each graphic and each audio content individually or can designate categories of graphics and audio content as undesired. The level of detail can be controlled by the administrator through manipulation of the GUI 100. In step 710, the PCS application can then generate and/or adjust user profiles based on the information obtained from the GUI 100 in the preceding steps.

From these illustrations, it would be apparent to an artisan of ordinary skill in the art that innumerable algorithms can be developed to analyze accessory usage and thereby suggest improvements. These undisclosed embodiments are contemplated by the present disclosure.

From the foregoing descriptions, it would be evident to an artisan with ordinary skill in the art that the aforementioned embodiments can be modified, reduced, or enhanced without departing from the scope and spirit of the claims described below. For example, the user profiles or accounts can include group profiles associated with a plurality of users. The use of a user profile can include storing of information, through various techniques and categorization, associated with users. The particular technique used to store this information can vary.

In one embodiment, the PCS application can be operated from other computing devices such as the media server 350 and/or a backend server dedicated to removing and/or replacing undesired content. In another embodiment, the PCS application can be used for monitoring user activity and providing information to the administrator. For example, time restrictions may be placed on use of the video games and notifications can be forwarded to the administrator when a violation of the time restriction has occurred.

In yet another embodiment, the PCS application can be utilized to remove undesired content independent of the particular gaming software application with which the restricted user is interacting. For example, the administrator can designate users from one of a plurality of levels of use. The designated level can then be utilized by the computing device to remove the undesired content that is associated with that particular designated level.

In another embodiment, a push-method can be utilized for providing parental control. For example, an administrator can remotely (such as via the Internet or other communication means) push a restrictive command to a controller to lock the game, or implement other control over the game behavior. For instance, a parent can realize that his or her child is playing a game instead of studying and remotely disable the game for a desired number of hours until the homework is done.

The exemplary embodiments can implement the administrative or parental control in a number of ways including through use of software, hardware and a combination of both. In one embodiment, a rating protocol can be generated which can be implemented by the video game and the controller. The video game through the counsel can receive a signal from the controller with the current user access level code (e.g., identified when using a controller) and can automatically enable only appropriate content for the user while locking out the rest of the content. The controller can also receive a signal from the video game with its rating level code and if the controller's user does not have the appropriate credentials, then the game and/or controller will lock out. One or both of these techniques can be implemented.

The exemplary embodiments, including the techniques described therewith, can be applied to various other media content and is not limited to video games. For instance, once the protocol is implemented, each of the DVD's or other media can include the code and corresponding remote controls can control the level of access and the content allowed for the identified user. Additionally, the exemplary embodiments, including the above-described protocol, can be exposed in the game GUI, allowing the administrator to control different settings. In another embodiment, the software and/or hardware can have a pass code that the parent defines and can be stored in the game whether on disk or if a hosted version on a server system (e.g., Steam).

The foregoing embodiments are a subset of possible embodiments contemplated by the present disclosure. Other suitable modifications can be applied to the present disclosure. Accordingly, the reader is directed to the claims for a fuller understanding of the breadth and scope of the present disclosure.

FIG. 8 depicts an exemplary diagrammatic representation of a machine in the form of a computer system 800 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 800 may include a processor 802 (e.g., a central processing unit (CPU), a graphics processing unit (GPU, or both), a main memory 804 and a static memory 806, which communicate with each other via a bus 808. The computer system 800 may further include a video display unit 810 (e.g., a liquid crystal display (LCD), a flat panel, a solid state display, or a cathode ray tube (CRT)). The computer system 800 may include an input device 812 (e.g., a keyboard), a cursor control device 814 (e.g., a mouse), a disk drive unit 816, a signal generation device 818 (e.g., a speaker or remote control) and a network interface device 820.

The input device 812 can be various types of devices including alphanumeric, analog joystick or other devices capable of providing an input interface such as touch-screen, voice control, motion sensors, and/or biometric.

The disk drive unit 816 may include a machine-readable medium 822 on which is stored one or more sets of instructions (e.g., software 824) embodying any one or more of the methodologies or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 824, or that which receives and executes instructions 824 from a propagated signal so that a device connected to a network environment 826 can send or receive voice, video or data, and to communicate over the network 826 using the instructions 824. The instructions 824 may further be transmitted or received over a network 826 via the network interface device 820.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:
1. A computing device, comprising:
a memory storing computer instructions; and
a controller coupled to the memory, wherein the controller, responsive to executing the computer instructions, performs operations comprising:
retrieving a gaming software application;
identifying undesired content of the gaming software application;
generating a parental-control graphical user interface that identifies the undesired content of the gaming software application in association with selectable options for replacement content;

identifying a selection of one of the selectable options by way of the parental-control graphical user interface;

storing an association of the undesired content and the selection of the one of the selectable options for replacement content in a user profile associated with a restricted user;

executing the gaming software application, wherein the gaming software application generates a game presentation that includes undesired content and other content;

determining, during the executing of the gaming software application, that the restricted user is interacting with the gaming software application, wherein the determining that the restricted user is interacting with the gaming software application is based on a monitoring during a present time interval; and modifying the game presentation of the gaming software application by replacing the undesired content with the replacement content based on the user profile to obtain a modified game presentation that includes the other content in response to determining that the restricted user is interacting with the gaming software application.

2. The device of claim 1, wherein the monitoring comprises one of a periodic monitoring or a continuous monitoring.

3. The device of claim 2, wherein the undesired content comprises one of graphic content or audio content.

4. The device of claim 3, wherein the replacing of the undesired content with the replacement content is responsive to a game actuation received from equipment of the restricted user.

5. The device of claim 1, further comprising receiving a bio-sensor signal associated with the restricted user, wherein the determining, during the executing of the gaming software application, when the restricted user is interacting with the gaming software application is based on the bio-sensor signal.

6. The device of claim 5, wherein the bio-sensor signal comprises one of a finger print of the restricted user or detected speech of a predetermined word.

7. The device of claim 5, wherein the bio-sensor signal is received from a gaming accessory in communication with the computing device, and wherein the operations further comprise receiving game control signals from the gaming accessory for user interaction with the gaming software application.

8. The device of claim 1, wherein the selection of the one of the selectable options is received from a gaming accessory in communication with the computing device, wherein the present time interval is identified in a schedule associated with the selection of the one of the selectable options, and wherein the selection of one of the selectable options comprises a plurality of selections of graphics and audio content to be replaced during the game presentation of the gaming software application.

9. The device of claim 8, wherein the controller, responsive to executing the computer instructions, performs operations comprising presenting a plurality of graphics and audio content for selection as desired content, wherein the selection of the one of the selectable options is based on the presenting of the plurality of graphics and audio content.

10. The device of claim 9, wherein the controller, responsive to executing the computer instructions, performs operations comprising receiving the desired content over a network from a media server.

11. The device of claim 1, wherein the controller, responsive to executing the computer instructions, performs operations comprising modifying presentations of a plurality of different gaming software applications by removing the undesired content based on the user profile.

12. A method comprising:

storing, by a system comprising a processor, a user account in a computing device, wherein the user account is associated with a restricted user;

generating, by the system, a parental-control graphical user interface that identifies undesired content of a gaming software application in association with selectable options for replacement content;

identifying, by the system, a selection of one of the selectable options by way of the parental-control graphical user interface;

storing, by the system, an association of the undesired content and the selection of the one of the selectable options for replacement content in the user account;

executing, by the system, a gaming software application, wherein the gaming software application generates a game presentation that includes undesired content and other content;

determining, by the system, during the executing of the gaming software application, when a restricted user associated with the user account is utilizing the gaming software application, wherein the determining is based on a monitoring during a present interval; and modifying, by the system, the game presentation of the gaming software application by replacing the undesired content with replacement content to obtain a modified game presentation that includes the other content based on the user account in response to the determining of when the restricted user associated with the user account is utilizing the gaming software application.

13. The method of claim 12, further comprising receiving at the computing device a removable storage medium having the gaming software application stored thereon.

14. The method of claim 12, wherein the selection of the one of the selectable options designates replacement content.

15. The method of claim 12, wherein the undesired content comprises graphics depicting content from a group consisting of: sexual content; violent content; and combinations thereof.

16. The method of claim 12, wherein the determining, repeatedly during the executing of the gaming software application, when the restricted user associated with the user account is utilizing the gaming software application, is based on identification information detected by a gaming accessory and transmitted to the computing device.

17. The device of claim 1, wherein the determining repeatedly during the executing of the gaming software application, comprises determining at least twice, during a video game, that the restricted user associated with the user profile is interacting with the gaming software application.

18. The device of claim 1, wherein the determining repeatedly during the executing of the gaming software application comprises determining at symmetric intervals that the restricted user associated with the user profile is interacting with the gaming software application.

19. The method of claim 12, wherein the determining repeatedly during the executing of the gaming software application comprises determining, at least twice, during a video game, that the restricted user associated with the user account is utilizing the gaming software application of the computing device.

20. The method of claim 12, wherein the determining repeatedly during the executing of the gaming software application comprises determining at symmetric intervals, that the restricted user associated with the user account is utilizing the gaming software application of the computing device.

\* \* \* \* \*